United States Patent Office 3,676,060
Patented July 11, 1972

---

3,676,060
APPARATUS FOR THE COMBUSTION OF TITANIUM TETRACHLORIDE WITH OXYGEN FOR THE PRODUCTION OF TITANIUM DIOXIDE PIGMENT
Gianfranco Bedetti, Milan, Italy, assignor to Montecatini Edison S.p.A., Milan, Italy
Original application Aug. 11, 1967, Ser. No. 660,035, now Patent No. 3,552,920, dated Jan. 5, 1971. Divided and this application Feb. 2, 1970, Ser. No. 12,490
Claims priority, application Italy, Aug. 16, 1966, 19,039/66
Int. Cl. B05b 7/10; C01g 23/04; B01j 1/00
U.S. Cl. 23—277 R                                1 Claim

ABSTRACT OF THE DISCLOSURE

Apparatus for the combustion of titanium tetrachloride with oxygen to titanium dioxide into a reaction chamber, the apparatus comprises a tubular cylindrical vortex chamber with an outlet end equipped with a flare towards the reaction chamber; a feeding device for the vortex chamber consisting of three ducts coaxial one with each other and with the vortex chamber, the inner one of said ducts feeding one of two auxiliary reactants has no swirl devices, the middle one, feeding a second auxiliary reactant is equipped with a swirl device. The coaxial flare ending in the reaction chamber diverges in its last part from the tubular body of an angle comprised between 10° and 45°. The ratio of the length of the conical flare versus the diameter of the tubular body is between 0.15 and 1. The ratio between the length of the vortex chamber and the diameter of said chamber is between 0 and 3. The ratio of the length of the portion of the duct where the mixing of the auxiliary reacting substances occurs, and the diameter of the duct is between 2 and 10.

---

This is a division of application Ser. No. 660,035, filed Aug. 11, 1967, now U.S. Pat. No. 3,552,920, and relates to apparatus for the combustion of titanium tectrachloride vapor with oxygen in the presence of nucleant and rutilizing substances. In this process and apparatus, the reactants are intimately mixed before leaving the terminal section of the combustion apparatus and react beyond this section in a reaction space contained in a reaction chamber. The process is, therefore, of the so-called "premixing" type. The production of titanium dioxide pigment having a high rutile ($TiO_2$) content requires, as known, a high reaction temperature (up to 1400–1600° C. and more). The heat developed by the reaction is insufficient to produce said temperatures when starting with cold or only moderately preheated reactants. It is, therefore, necessary to supply some heat to the reaction zone. Technically it is not possible to supply heat through the wall, because of the formation of crusts, by reaction on the wall, and of the deposition of metal oxide particles which form an insulating layer.

It was therefore tried to supply the heat necessary for the process by separately preheating the reacting gases up to temperatures of 800° C. and more. From a technical viewpoint, this strong preheating implies considerable problems, requiring the use of ceramic or quartz material because of the high corrosivity of the reacting substances at these high temperatures. Moreover, there is the danger of clogging the reactant inlets because of the rapid reaction between reactants when once brought into contact.

Another process consists in reacting titanium tetrachloride and oxygen premixed and moderately preheated, by a pilot flame of an auxiliary fuel with oxygen which supplies, moreover, the heat necessary to reach the desired reaction temperature. This process has been applied, for instance, in burners consisting of concentric tubes wherein the reaction mixture is fed by a tube or an annulus of limited thickness and is surrounded by an auxiliary diffusion flame of oxygen and combustible gas. The building up of deposits on the walls of the burner is here prevented by making thinner the terminal wall of the tube, so as to have thin walls and thus prevent the formation of local recirculation vortexes and igniting the reaction mixture at the exit of the burner. The quick start of the reaction in the whole of the reacting mixture, necessary to obtain a product homogeneous as to the dimension of the particles while having a high rutile content, is achieved by limiting the thickness of the reacting streams, and by using multiple feeding systems. That is, there are more tubes or more annuli feeding the reaction mixture.

The working conditions of these burners are very strict, particularly since the inlet speed of the combustible gas and of the oxygen must not exceed limits connected with the blow-off of the flame. For instance, when using carbon monoxide as the auxiliary combustible gas, the average maximum speed is of the order of a few meters per second. Moreover, the product obtained tends to contain too many fine particles.

The present invention provides an improved process for the combustion of titanium tetrachloride to titanium dioxide, capable to eliminate these and other inconveniences, as well as an apparatus to carry out the same process. This aim is attained by the process of my invention which is essentially characterized by the fact that:

(a) Two gas streams are fed into the reaction zone:

(1) one consisting of titanium tetrachloride and oxygen perfectly premixed;
(2) a second concentrically enveloped by the first one and containing an auxiliary fuel and oxygen, totally or partially premixed;

(b) A swirl-flow is impressed to both streams or only to the inner one with such an intensity that they leave the burner and reach the reaction zone as an annular jet or gaseous film which encloses a central recirculation totally immersed in the resulting stream leaving the burner.

The central recirculation is spontaneously generated by the swirl-flow of the reactants just at the foot of the burner and is formed by a closed vortex completely immersed in the gas flow leaving the burner. This vortex is stationary, i.e. keeps its position unchanged in time, owing to the equilibrium between the tangential turbulent forces and the normal ones (due to the pressure field) which act on it. Said vortex, like a solid body, changes the kinetic field of the flow of the reacting substances causing a stagnation point in the midst of it, at which the velocity of the stream leaving the burner is zero.

In order to explain the phenomenon of the formation of the vortex and of the stabilization of the flame, I shall now refer to the drawings in which:

FIG. 1 schematically represents a very simple device which allows the reaction between premixed reactants in the gaseous phase;

Figure 1:
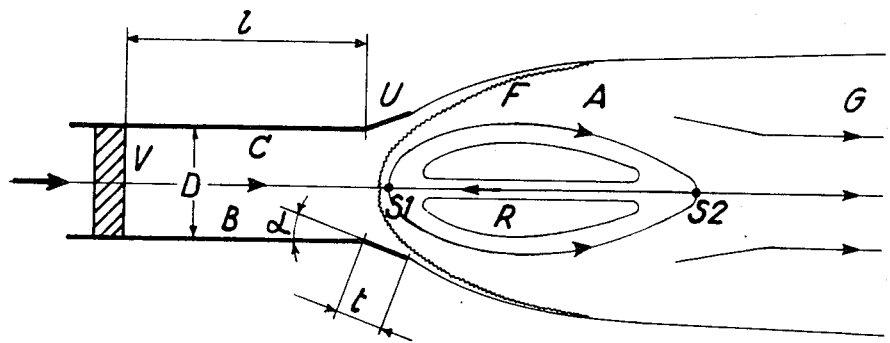

The apparatus suitable for the realization of the process according to my invention, as well as the process itself, will be illustrated hereinbelow, where the same numerals represent the same thing in all figures. In FIG. 1, for instance, the stream C, formed by two premixed reactants which can cause an exothermic reaction, is given a swirl-flow by the swirl device V, and moves inside the vortex chamber B. The stream opens beyond the stagnation point S1, so as to form an annular jet A, and then it shuts again beyond the stagnation point S2, so as to form a compact jet G. The recirculation zone R, contained between S1 and S2, is a stationary hot vortex containing the reacting substances as well as the end and intermediate products of the reaction. The recirculation R obviously has a temperature intermediate the preheating temperature of the reacting substances and the final temperature of the products. The recirculation R starts the chemical reaction between the entering reactants by transfer of heat by conduction and convection from the recirculation to the reacting substances which are thus heated to a value higher than the ignition temperature. This stabilization phenomenon can occur when, in stationary conditions, the heat transferred from the vortex to the reacting substances exceeds a certain lower limit value depending upon the physico-chemical conditions in the ignition zone. As the heat transferred to the reacting substances depends upon the rate of the chemical reactions taking place in the ignition zone (intermediate reactions in the case of slow global reactions) and on the heat of reaction of the same, it is clear that the ignition phenomenon may not occur for some reactants under prefixed physical feeding conditions.

This occurs in the case of titanium tetrachloride mixed with oxygen, even in a stoichiometric ratio, when the temperature of the reacting substances is not high enough.

Figure 2:
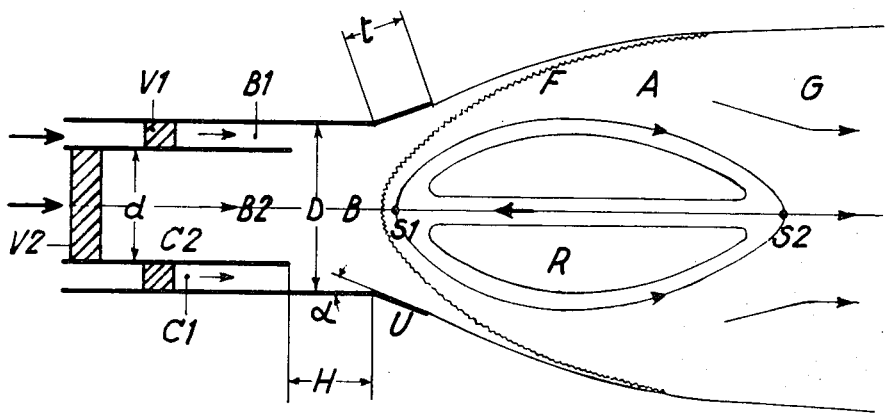
FIG. 2 represents a particular embodiment of my apparatus.

My invention eliminates this inconvenience and will now be described with reference to FIG. 2 which represents a particular form, which has no limiting character, of an apparatus for the realization of the same process. The stream of the premixed principal reactants C1, i.e. a mixture of titanium tetrachloride, oxygen and occasional nucleant and rutilizing substances, is given a swirl-flow by the swirl device V1 and moves in the annular vortex chamber B1. The stream of the premixed secondary reactants C2, i.e. a mixture of an auxiliary fuel and oxygen, is given a swirl-flow by the swirl device V2 and moves in the cylindrical or almost cylindrical vortex chamber B2, coaxial to vortex chamber B1. The two streams enter the common vortex chamber B, open in correspondence to the flare of the terminal part of the apparatus, and then shut again; giving rise, in the gas flow, to the recirculation zone R formed by a stationary vortex. Downstream the stagnation point S1, an annular jet A is formed in which the two feeding streams mix together. The jet A then closes again in a compact jet G beyond the stagnation point S2. Beyond S1, the recirculation R mostly contains the intermediate and end products of both the combustion reactions, while upstream the surface of the vortex around S1 the stream totally or mostly consists of the auxiliary mixture coming from the vortex chamber B2. The composition in this zone depends on the length H of the vortex chamber R, which it is convenient to keep short, in order to limit the mixing of the two streams in it. As a limit, the length of this chamber can be zero. The mixture of the auxiliary reactants ignites just upstream of the stagnation point S1 and rapidly reacts in the stabilization zone, developing an amount of heat sufficient to exceed the lower limit value necessary for stationary stabilization of the flame front. The flame front F develops downstream inside the annular jet A as indicated in FIG. 2. The reaction space is obviously beyond it.

The formation of the vortex and, therefore, of the annular jet, is dominated by the following dimensionless groups (with reference to FIG. 2):

$$\alpha, \frac{H}{D}, \frac{t}{D}, \frac{d}{D}, \left(\frac{\Gamma}{Md}\right)_{\text{inner stream}}, \left(\frac{\Gamma}{MD}\right)_{\text{outer stream}}$$

where $\alpha$ = angle of the flare with respect to the axis of the apparatus,
$H$ = length of the vortex chamber B,
$t$ = length of the flare,
$D$ = diameter of the vortex chamber B,
$d$ = diameter of the inner vortex chamber B2,
$\Gamma$ = flux of the moment of the gas stream momentum with respect to the axis of the apparatus,
$M$ = flux of the axial component of the momentum of the gas stream.

The indexes "inner stream" and "outer stream" indicate that the values of $\Gamma$ and $M$ must be calculated with respect to the inner and, respectively, outer gas stream. Rather than to the two distinct values of the ratios $$\left(\frac{\Gamma}{Md}\right)_{\text{inner stream}}$$

and $$\left(\frac{\Gamma}{MD}\right)_{\text{outer stream}}$$

one can refer as a first approximation, to the value of $$\frac{\Gamma}{MD}$$

of the total stream before it leaves the apparatus.
The value of $$\left(\frac{\Gamma}{MD}\right)_{\text{outer stream}}$$

can also be zero, when the value of $$\left(\frac{\Gamma}{Md}\right)_{\text{inner stream}}$$

is sufficiently high.

According to the present invention, the value of $\alpha$ may vary between about 10° and 45°, $H/D$ between 0 and 3, $t/D$ between 0.15 and 1, and $d/D$ between 0.3 and 0.9. The value of $\Gamma/MD$ for the total stream must be between a lower and an upper limit which chiefly depend upon the angle $\alpha$ and is empirically determined.

For values of $\Gamma/MD$ smaller than the lower limit, no formation of the vortex occurs, while for values higher than the upper limit the annular jet does not close again.

Figure 3:
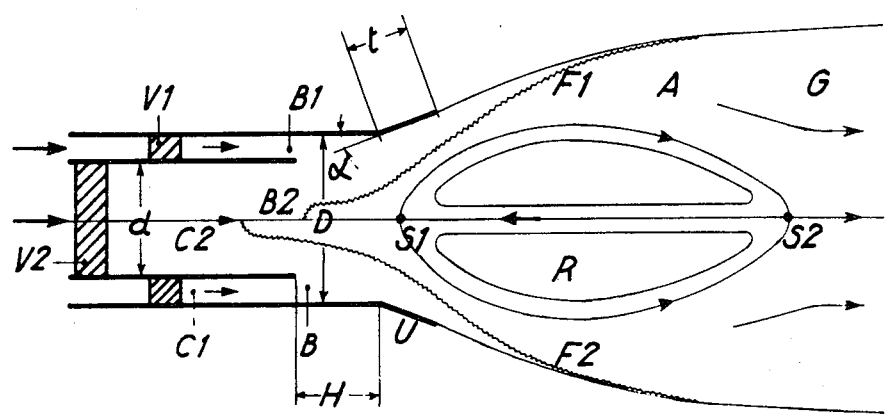
FIG. 3 shows another embodiment for carrying out the process.

For instance, in a simulated combustion test carried out under the conditions specified below, a ratio between the length of the vortex and the diameter $D$ of about 4 and a ratio, between the maximum transverse dimension of the vortex and the diameter D, of about 2 have been observed. The conditions were as follows (see FIG. 4):

$\alpha = 40°$, $\frac{d}{D} = 0.625$, $\frac{dl}{d} = 0.55$, $\frac{H}{D} = 3.0$, $\frac{t}{D} = 0.28$, length of the mixing chamber B2 = 5d $\left(\frac{\Gamma}{Md}\right)_{\text{inner stream}} = 1.59$ $\left(\frac{\Gamma}{MD}\right)_{\text{outer stream}} = 0.864$ $O_2 = 15$ Nm.$^3$/h., at 10° C., fed into the central duct T,
$CO = 30$ Nm.$^3$/h., at 10° C., fed into the internal annulus provided with a swirl device,
air = 70 Nm.$^3$/h., at 10° C., fed into the external annulus provided with a swirl device, The starting surface of the reaction corresponded to the position indicated as F2 in FIG. 3.

The apparatus described above with reference to FIG. 2 permits, by suitably acting on the above-listed variables and remaining within the specified intervals, obtaining the combustion in a way different from that described. The combustion of the auxiliary reactants can now start inside the vortex chamber B2 as depicted in FIG. 3 where F1 and F2 are the surfaces of starting reaction. This working procedure has the advantage that a great deal of the auxiliary reactants reacts before contacting with the principal reactants. This fact allows the combustion of titanium tetrachloride with oxygen to be carried out at very low preheating temperatures i.e. at temperatures very close to the condensation temperature of the titanium tetrachloride vapors. The described process is obviously independent from the way of formation of the swirl-flow and of the mixing of the auxiliary reactants (inner stream), which characterize the feeding in the vortex chamber B2.

Figure 4:
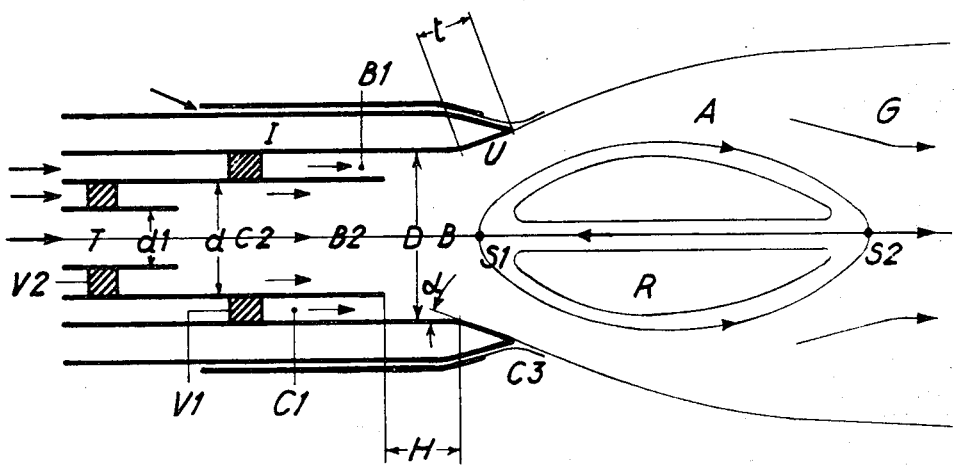
FIG. 4 shows another embodiment for carrying out my invention.

FIG. 4 illustrates a possible variation of the process and apparatus of the present invention. Both the alternatives of FIG. 2 and FIG. 4, which will now be described in detail, are obviously part of the same invention.

The vortex chamber B2 is fed by the stream of one of the auxiliary reactants with a purely axial flow through duct T and by the stream of the second auxiliary reactant having a swirl-flow imparted to it by the swirl device V2, put in an annular duct coaxial to duct T and to the vortex chamber B2. The vortex chamber B2 must have a length sufficient to allow a mixing, complete or not, of the two reacting substances. The best results are obtained with a length of the vortex chamber B2 between 2 and 10 times its diameter. External and coaxial to it is the annular vortex chamber B1, which is fed by a premixed stream C1 of the principal reactants having a swirl-flow impressed to it by the swirl device V1. The two streams come out in the vortex chamber B, coaxial to the preceding chambers, which ends in a conical flaring.

Obviously also for the case illustrated in FIG. 4, the above-exposed considerations on the importance of the geometric and dynamic parameters considered above stand. Moreover, one must take into consideration the ratio $d/d$, upon which depends the value of the ratio between the axial components of the feeding velocities of the two streams in the vortex chamber B2. The speed ratio may take convenient values within wide limits (0.2–5), which mainly depend on the value $\left(\frac{\Gamma}{Md}\right)_{\text{inner stream}}$ In FIG. 4 a thermal control circuit is depicted consisting of a jacket in which a suitable thermostatic liquid flows. Furthermore, C3 schematically indicates a gas stream which surrounds, like a film, the outer walls of the burner to prevent the formation of crusts on the outside of the terminal part of the burner, caused by an external recirculation. Obviously, the apparatus in FIGS. 2 and 3 can also be supplied with the thermostatic circuit and with the protecting gas film.

The formation of crusts by reaction between titanium tetrachloride and oxygen on the inner walls of the terminal part of the burner is prevented by the generation of a flame front which develops within the reaction mixture as described above.

The invention will be further illustrated in the following examples, given for an indicative and not limitative purpose.

EXAMPLE 1

This example refers to a realization of the process under the conditions indicated in FIG. 3, with starting front F2.

The burner employed is the one schematically shown in FIG. 4 with:

$\alpha = 10°$ $\frac{H}{D} = 0.53$ $\frac{t}{D} = 0.31$ $\frac{d}{D} = 0.56$ $\frac{dl}{d} = 0.61$ $\left(\frac{\Gamma}{Md}\right)_{\text{inner stream}} = 1.182$ $\left(\frac{\Gamma}{MD}\right)_{\text{outer stream}} = 0$ The burner is installed in a cylindrical reaction chamber having a diameter of 200 mm.

Feed $O_2$ for the combustion of CO (fed into the axial duct T) = 4.25 Nm.$^3$/h. at T = 160° C.; $H_2O$ content negligible.

CO (fed into the annulus carrying the swirl device V2) = 7.35 Nm.$^3$/h. at T = 160° C.; $H_2$ content = 0.4%; $H_2O$ content negligible.

Reaction mixture: 9.18 Nm.$^3$/h. of $TiCl_4$ vapor; 10 Nm.$^3$/h. of $O_2$ ($H_2O$ content negligible).

Moreover, 0.290 Nm.$^3$/h. of $AlCl_3$ sublimated in a stream of 0.6 Nm.$^3$/h. of nitrogen are introduced. The reaction mixture is preheated to 160° C.

Protection gas of the outside nozzle: $O_2 = 2$ Nm.$^3$/h, T = 20° C.

The reaction product contains more than 98% of rutile, has an average particle size of 0.22$\mu$ and a Reynolds tinting strength of 2000.

Moreover, the product has a very narrow particle size distribution.

EXAMPLE 2

This example refers to a realization of the process under the conditions indicated in FIG. 2 with starting front F.

The burner employed is the one schematically shown in FIG. 4 with:

$\alpha = 10°$ $\dfrac{H}{D} = 0.53$ $\dfrac{t}{D} = 0.31$ $\dfrac{d}{D} = 0.563$ $\dfrac{dl}{d} = 0.612$ $\left(\dfrac{\Gamma}{MD}\right)_{\text{inner stream}} = 0.567$ $\left(\dfrac{\Gamma}{MD}\right)_{\text{outer stream}} = 0.284$ The burner is installed in a cylindrical reaction chamber having a diameter of 200 mm.

Feed $O_2$ for the combustion of CO=3.5 Nm.$^3$/h, $H_2O$ content negligible; T=160° C.

CO=5.8 Nm.$^3$/h., $H_2$ content=0.2% content negligible; T=160° C.

Reaction mixture: 8.2 Nm.$^3$/h. of $TiCl_4$ vapor; 10.8 Nm.$^3$/h. of $O_2$ ($H_2O$ content negligible).

Moreover, 0.26 Nm.$^3$/h. of $AlCl_3$ sublimated in a stream of 0.56 Nm.$^3$/h. of $N_2$ are introduced.

Preheating temperature of the mixture of the principal reactants=350° C.

Protection gas for the outside nozzle: $O_2$:2 Nm.$^3$/h.; T=20° C.

The reaction product contains more than 97% of rutile, has an average particle size of 0.20μ and a Reynolds tinting strength of 1800.

The term Nm.$^3$/h. as used herein means cubic meters per hour calculated at standard or normal conditions.

I claim:

1. Apparatus for the combustion of titanium tetrachloride with oxygen to titanium dioxide which comprises a tubular cylindrical vortex chamber through which streams of the reacting gases pass, said vortex chamber possessing an outlet and provided with a flare towards the outside, a feeding device for the vortex chamber consisting of three ducts coaxial one with the others and with the vortex chamber, of which the inner one, which feeds one of the two auxiliary reactants, has no swirl device, the middle one, which feeds the second auxiliary reactant, is provided with a swirl device, and the outer one, feeds the mixture of the principal reacting substances, the angle formed by the portion of the conical flare diverging of the tubular body with the remaining part of said body is between 10° and 45°, the ratio of length of the conical flare and the diameter of the tubular body is between 0.15 and 1, the ratio between the length of the vortex chamber and the diameter of said chamber is between 0 and 3, and the ratio of length of the portion of the duct where the mixing of the auxiliary reacting substances occurs and the diameter of said duct is between 2 and 10.

References Cited

UNITED STATES PATENTS

| 3,403,001 | 9/1968 | Mas et al. | 23—277 X |
| 3,485,566 | 12/1969 | Schoppe | 431—183 |
| 2,806,517 | 9/1957 | Te Nuyl | 431—183 |

FOREIGN PATENTS

| 892,151 | 3/1962 | Great Britain. |
| 924,119 | 4/1963 | Great Britain. |

JAMES H. TAYMAN, Jr, Primary Examiner

U.S. Cl. X.R.

23—284; 431—9, 173, 8, 187; 239—403